T. C. LUCE.
CLASP.
APPLICATION FILED APR. 15, 1908.
933,190.
Patented Sept. 7, 1909.
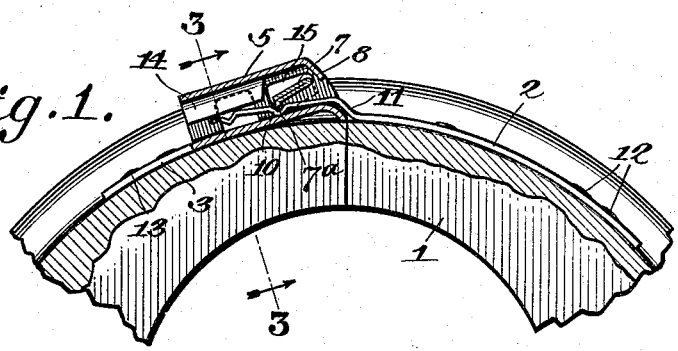
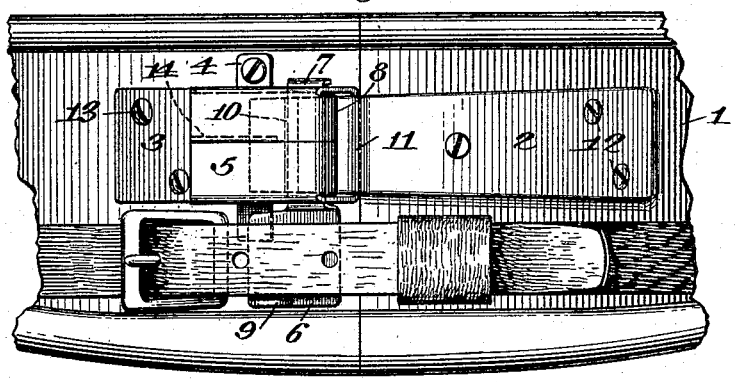
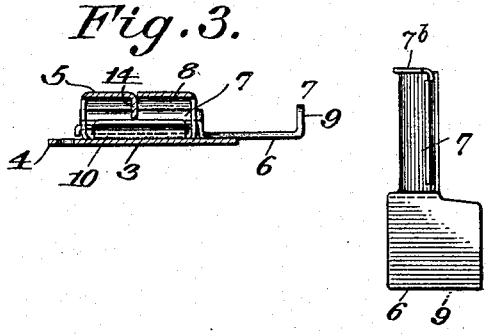
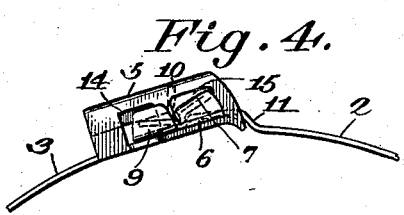
Witnesses:
Oscar M. Schillinger
John B. Woodbury
Inventor:
Thomas C. Luce

UNITED STATES PATENT OFFICE.

THOMAS C. LUCE, OF DALTON, MASSACHUSETTS.

CLASP.

933,190.

Specification of Letters Patent.   Patented Sept. 7, 1909.

Application filed April 15, 1908.   Serial No. 427,186.

*To all whom it may concern:*

Be it known that I, THOMAS C. LUCE, of Dalton, Berkshire county, Massachusetts, have invented a new and useful Improvement in Clasps, of which the following is a full, clear, and exact description.

My invention relates to improvements in clasps.

The object of my invention is to produce a cheap, strong and simple clasp which is especially adapted for use in fastening the ends of a horse collar together, and which when so used is constructed in such a way that the hame strap will effectually prevent the unlocking of the clasp. The invention, however, can be applied to other meeting parts, and affords a simple and secure fastening which can be conveniently operated.

Reference is to be had to the accompanying drawings forming a part of this specification, in which similar reference characters indicate corresponding parts in all the views.

Figure 1 is a longitudinal section of the clasp embodying my invention, showing the same as applied to a horse collar. Fig. 2 is a plan view of the device as applied to a horse collar and shows the hame strap in a position to lock the clasp. Fig. 3 is a cross section on the line 3—3 of Fig. 2, showing the clasp in detail. Fig. 4 is a detail side elevation of the clasp, and Fig. 5 is a detail of the catch which forms a part of the clasp.

The clasp is provided with opposed plates 2 and 3 which I have shown attached to opposite parts and meeting ends of the horse collar 1. The plate 3 is turned down as shown in Figs. 1 and 4, at the end next to the plate 2, so as to properly guide the free end of the plate 2 as hereinafter described, and the plates 2 and 3 are firmly secured to the horse collar by rivets 12 and 13. The plates 2 and 3 are preferably of sheet metal, and the protruding end of the plate 2 is preferably of spring metal. The plate 3 is further secured to the collar by lips 4 through which extend rivets which serve to hold it in place. At its front end the plate 3 is provided with a socket member or housing 5, which is open at the ends, and which is made preferably of the same sheet metal which composes the plate 3, and it has its front end bent down as shown at 8 to form a better support for the catch 7 which is flat, and extends transversely through openings 15 in the sides of the socket member or housing 5, these openings 15 being wedge shaped with their narrow edges toward the front of the socket member 5, and the catch 7 can have its inner edge raised or lowered in the said openings 15. The catch 7 has a lip $7^a$ at its inner edge, which is turned down to engage the notches 10 in the free end of the plate 2, this free end being bent up slightly as shown at 11 so as to be on a slightly different plane from the body of the plate 2, thus enabling it to easily enter the socket member 5. One end of the catch 7 is also provided with a lip $7^b$, which prevents it from being displaced in one direction. At its opposite end which protrudes from the socket member 5, the catch 7 is widened as shown at 6, and provided with an upturned flange 9. This widened member 6 is adapted to come beneath the hame strap of the collar as shown in Fig. 2, and thus when the hame strap is in place, the catch is held securely with the lip $7^a$ in engagement with one of the notches 10 in the free end of the plate 2, so that the free end of the plate is locked in position and the two parts of the collar held securely in place.

To prevent the free end of the plate 2 from following up the catch 7 when the inner edge of the latter is raised, an abutment 14 is placed in the top of the member 5 and projects downward into the same so as to strike the free end of the plate 2 as shown clearly in Fig. 1. This abutment 14 can be formed in any convenient way, but an easy and simple method is to simply cut into the top of the member 5 and turn down the metal to form the abutment 14. It will be seen that when the two members of the clasp are brought together, the catch 7 will securely lock them.

It will of course be understood that some of the details of the construction which I have described, may be departed from more or less without affecting the principle of the invention, the essential thing of which is the socket member, the notched plate to enter the same, and the transverse catch arranged substantially as shown, together with the hame strap for locking the same.

I have shown my improved clasp applied to a horse collar, as it is especially adapted to this use, but I do not limit it to such use because obviously the clasp can be used for holding together other meeting parts as well as the ends of a horse collar.

Having thus fully described my invention, I claim as new and desire to secure by Letters Patent:—

1. A fastening of the kind described, comprising a socket member adapted to be secured to the top of a horse collar near one of its meeting edges, said socket member having a projecting curved lip, an inturned abutment on the top of the socket member, a tilting latch member arranged transversely in the socket member and provided with an engaging lip and an outwardly protruding flattened portion to engage a hame strap, and a spring plate secured to the opposite member of the collar and having its free end provided with notched edges, said plate being constructed to enter the socket member beneath the abutment and in engagement with the tilting or latch member in said socket.

2. A fastening device of the kind described, comprising opposed members adapted for attachment to the outside of a horse collar at the meeting parts thereof, one member comprising an open ended socket or housing having a downwardly projecting abutment in the top thereof, and a vertically swinging latch member transversely arranged in the housing and having a flattened outer portion adapted to extend beneath a hame strap, and a second member comprising a spring plate having a free notched end shaped to enter the housing beneath the latch member and beneath the aforesaid abutment.

3. A horse collar or other device comprising hinged sections and means for securing the free ends thereof together, comprising a casing secured to a collar member, a tilting member therein and adapted to be retained in a predetermined position by a strap around said collar sections, a spring plate on the other of said collar sections, having notches for engagement with said tilting member, and a stop in said casing adapted to engage the said spring plate upon the partial tilting of said tilting member, to allow the latter to be disengaged therefrom.

THOMAS C. LUCE.

Witnesses:
OSCAR M. SCHILLINGER,
JOHN B. WOODBURN.